(12) United States Patent
Park et al.

(10) Patent No.: US 9,001,301 B2
(45) Date of Patent: Apr. 7, 2015

(54) LIQUID CRYSTAL DISPLAY AND METHOD OF MANUFACTURING THE SAME

(75) Inventors: Jae-Hyun Park, Namyangju-si (KR); Jong Oh Kim, Asan-si (KR); Da Hye Cho, Goyang-si (KR); Jin Suk Seo, Cheonan-si (KR); Jong Bum Choi, Pohang-si (KR)

(73) Assignee: Samsung Display Co., Ltd. (KR)

( * ) Notice: Subject to any disclaimer, the term of this patent is extended or adjusted under 35 U.S.C. 154(b) by 319 days.

(21) Appl. No.: 13/194,626

(22) Filed: Jul. 29, 2011

(65) Prior Publication Data

US 2012/0154720 A1    Jun. 21, 2012

(30) Foreign Application Priority Data

Dec. 21, 2010 (KR) .................. 10-2010-0131474

(51) Int. Cl.
   *G02F 1/1339*     (2006.01)
   *G02F 1/1345*     (2006.01)

(52) U.S. Cl.
   CPC .......... *G02F 1/1339* (2013.01); *G02F 1/13394* (2013.01); *G02F 1/1345* (2013.01)

(58) Field of Classification Search
   USPC .......................................... 349/149–154, 190
   See application file for complete search history.

(56) References Cited

U.S. PATENT DOCUMENTS

| | | | |
|---|---|---|---|
| 7,214,115 B2 | 5/2007 | Park | |
| 2003/0038913 A1* | 2/2003 | Choo | 349/149 |
| 2005/0001969 A1* | 1/2005 | Kim et al. | 349/153 |
| 2005/0243261 A1* | 11/2005 | Chiang et al. | 349/155 |
| 2007/0058125 A1* | 3/2007 | Yoo et al. | 349/152 |
| 2007/0076160 A1* | 4/2007 | Shiiba et al. | 349/153 |
| 2007/0103633 A1* | 5/2007 | Yoo et al. | 349/153 |
| 2007/0236643 A1* | 10/2007 | Fu | 349/153 |
| 2008/0273133 A1* | 11/2008 | Bae et al. | 349/42 |

FOREIGN PATENT DOCUMENTS

| | | |
|---|---|---|
| JP | 2001-166315 A | 6/2001 |
| JP | 2002-277865 A | 9/2002 |
| JP | 3662103 B | 4/2005 |
| JP | 2006-178301 A | 7/2006 |
| JP | 4488674 B | 4/2010 |
| KR | 1019940024475 A | 11/1994 |
| KR | 1020040107937 A | 12/2004 |
| KR | 1020060040104 A | 5/2006 |
| KR | 1020080026836 A | 3/2008 |
| KR | 1020080082086 A | 9/2008 |
| KR | 10-0911468 B | 8/2009 |
| KR | 1020100079089 A | 7/2010 |

* cited by examiner

*Primary Examiner* — Jessica M Merlin
(74) *Attorney, Agent, or Firm* — Innovation Counsel LLP

(57) ABSTRACT

A liquid crystal display that includes: a first substrate and a second substrate each including a display area and a non-display area, the display and non-display areas positioned opposite to each other; a plurality of data driver ICs formed in the non-display area of the first substrate; a plurality of data voltage supply lines connected to the data driver ICs and extending to the display area of the first substrate; a sealant positioned between the first substrate and the second substrate to surround the display areas; and a step compensating member formed outside the sealant on the non-display area of one of the first substrate and the second substrate, in which at least some of the data voltage supply lines extend under the sealant, and the step compensating member is positioned generally inline with the at least some of the data voltage supply lines.

34 Claims, 22 Drawing Sheets

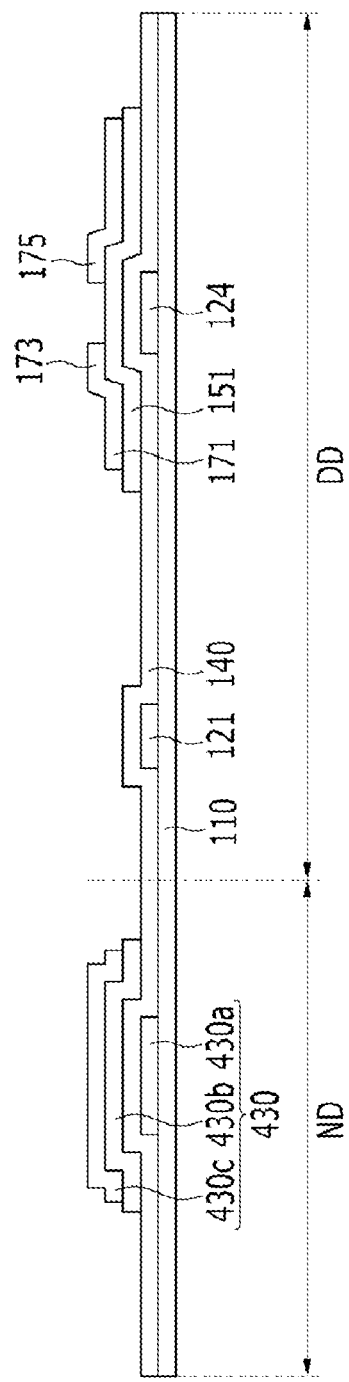

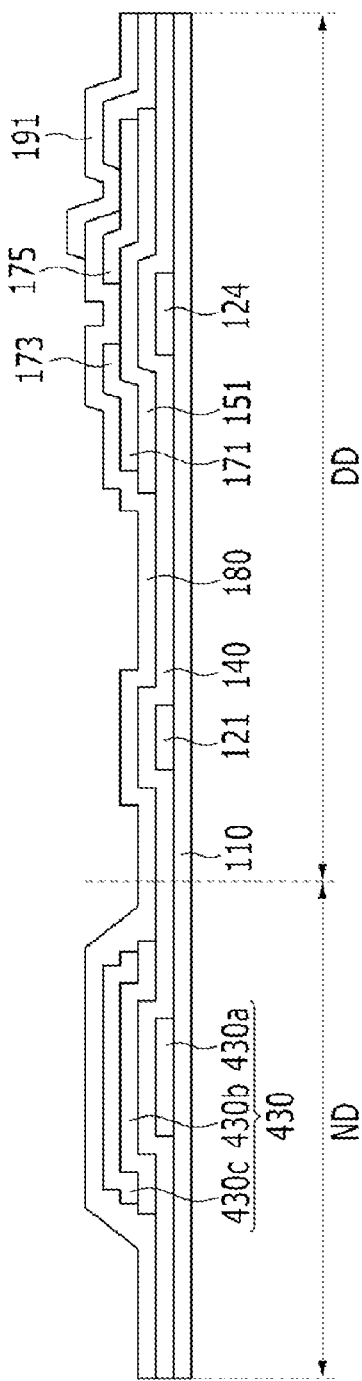

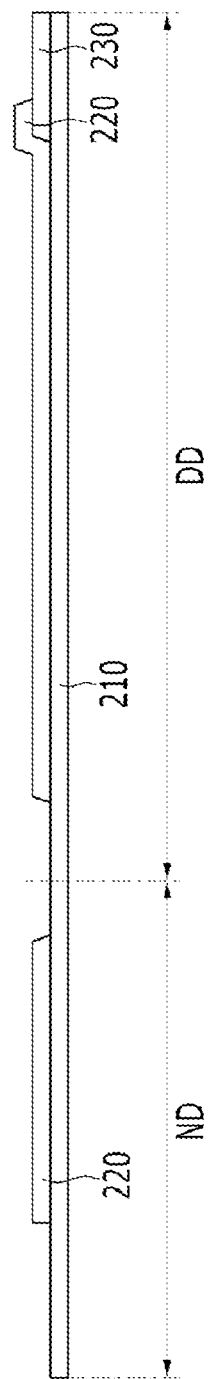

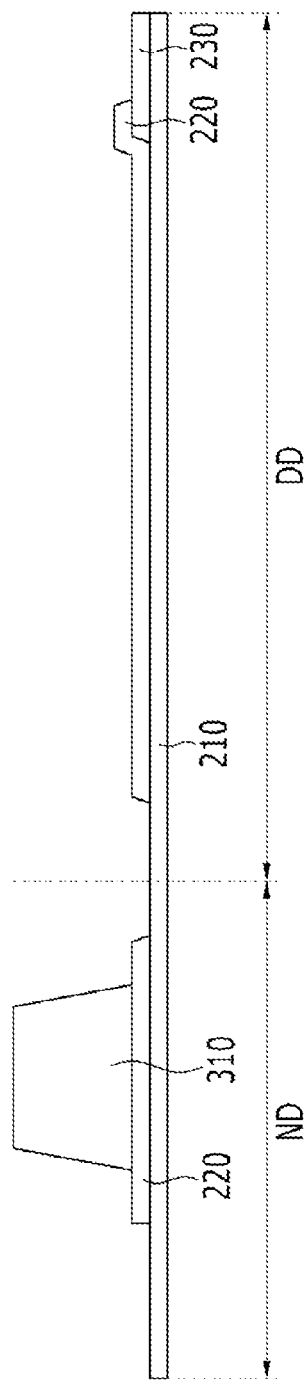

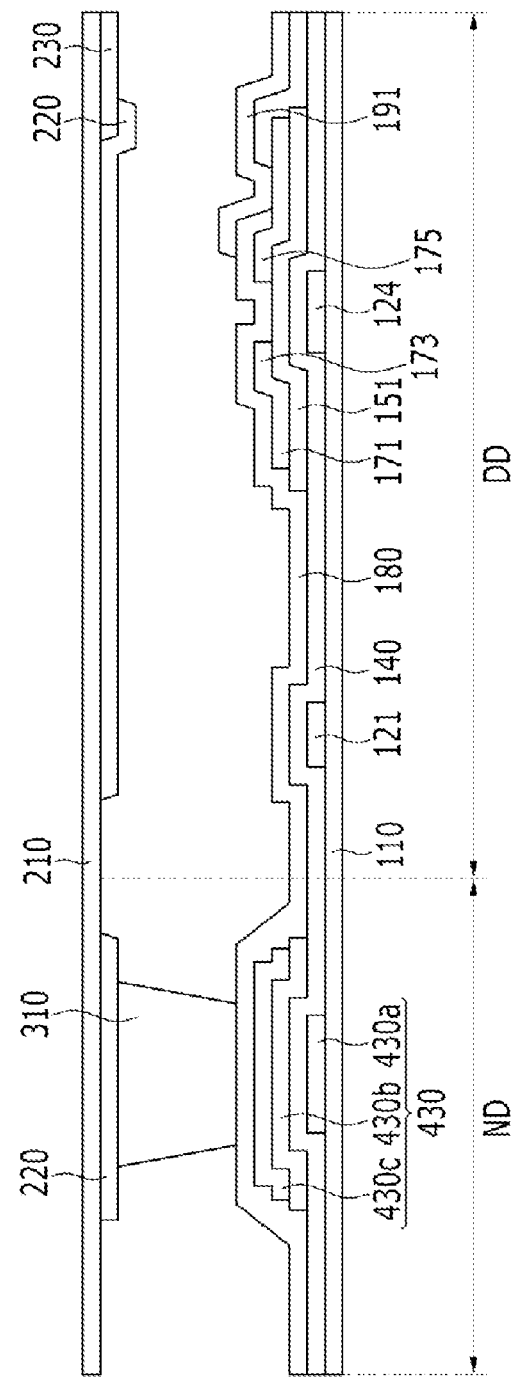

LIQUID CRYSTAL DISPLAY AND METHOD OF MANUFACTURING THE SAME

CROSS-REFERENCE TO RELATED APPLICATION

This application claims priority to, and the benefit of, Korean Patent Application No. 10-2010-0131474 filed in the Korean Intellectual Property Office on Dec. 21, 2010, the entire contents of which are incorporated herein by reference.

BACKGROUND OF THE INVENTION (a) Field of the Invention

Embodiments of the present invention relate generally to liquid crystal displays. More particularly, embodiments of the present invention relate to liquid crystal displays that can prevent partial stains due to a difference in cell gap, and methods of manufacturing the same.

(b) Description of the Related Art

Liquid crystal displays, which are among the most popular types of flat panel displays, are typically composed of two display panels with field generating electrodes, such as a pixel electrode and a common electrode, and a liquid crystal layer between the display panels. These displays produce images by generating an electric field when a voltage is applied to the field generating electrodes, such that the liquid crystal molecules in the liquid crystal layer are aligned to control polarization of incident light.

The liquid crystal displays are composed of a display area and a non-display area, and a sealant is formed between the two display panels to surround the display area affix the display panels to each other. A data driver IC is often placed in the non-display area at a side of the liquid crystal display, and a data voltage supply line is connected to the data driver IC, extending to the display area.

The presence of the data voltage supply line increases the cell gap between the display panels, as compared to the portion without the data voltage supply line. This problem is more serious in high-resolution liquid crystal displays, such that stains can be generated near the data voltage supply lines when the liquid crystal display operates.

Further, the sealant of the liquid crystal display may overlap a plurality of metal patterns. However, in this configuration, the cell gap is larger where the patterns overlap the sealant, and smaller where they do not. This also leads to the above-described problem of non-uniform cell gap.

The above information disclosed in this Background section is only for enhancement of understanding of the background of the invention, and therefore it may contain information not in the prior art.

SUMMARY OF THE INVENTION

In one embodiment, the invention includes a liquid crystal display that can prevent or reduce staining due to variations in cell gap, as well as a method of manufacturing such a liquid crystal display.

An exemplary embodiment of the present invention provides a liquid crystal display including: a first substrate and a second substrate each including a display area and a non-display area, the display areas positioned opposite to each other and the non-display areas positioned opposite to each other; a plurality of data driver ICs formed in the non-display area of the first substrate; a plurality of data voltage supply lines connected to the data driver ICs and extending to the display area of the first substrate; a sealant positioned between the first substrate and the second substrate to surround the display areas; and a step compensating member formed outside the sealant on the non-display area of one of the first substrate and the second substrate, wherein at least some of the data voltage supply lines extend under the sealant, and the step compensating member is positioned generally inline with the at least some of the data voltage supply lines.

A plurality of the step compensating members may be formed so that at least two have differing distances from the sealant.

A distance between the step compensating members and the sealant may increase with increasing size of a cell gap between the first substrate and the second substrate.

A plurality of the step compensating members may be formed so that each has approximately the same distance from the sealant.

A thickness of the step compensating members may increase with increasing size of a cell gap between the first substrate and the second substrate.

The liquid crystal display may further include light blocking members having widths larger than that of the sealant and formed between the first substrate and the second substrate so as to surround the display area.

The liquid crystal display may further include a spacer formed in the display area between the first substrate and the second substrate, in which the step compensating member may be made of the same material as the spacer.

The step compensating member may comprise a metal.

The liquid crystal display may further include color filters formed in the display area of the first substrate or the second substrate, in which the step compensating member may comprise a same material as the color filters.

The liquid crystal display may further include light blocking members formed in the display area of the first substrate or the second substrate to partially overlap the color filters, in which the step compensating members may comprise the same material as the color filters and the light blocking members.

The step compensating member may comprise a general polygon, circle, or ellipse shape.

Another exemplary embodiment of the present invention provides a method of manufacturing a liquid crystal display, including: (a) receiving a first mother substrate and a second mother substrate which are each divided into a plurality of panel regions each including a display area and a non-display area; (b) forming a plurality of data driver ICs in the non-display area of the first mother substrate, and forming a plurality of data voltage supply lines connected to the data driver ICs and extending to the display area of the first mother substrate; (c) forming a step compensating member in the non-display area of one of the first mother substrate and the second mother substrate; and (d) forming a sealant on one of the first mother substrate and the second mother substrate to surround the display area, in which the step compensating member is positioned outside the sealant, at least some of the data voltage supply lines extend under the sealant, and the step compensating member is positioned generally inline with the at least some of the data voltage supply lines.

The method may further include (e) separating the first mother substrate and the second mother substrate along the panel regions.

The step compensating member may be formed inside the panel region, and in (e), the step compensating member may remain on the liquid crystal display.

The step compensating member may be formed outside the panel region, and, in (e), the step compensating member is removed from the liquid crystal display.

A plurality of the step compensating members may be formed and the step compensating members may have differing distances from the sealant.

A distance between the step compensating members and the sealant may increase with increasing size of a cell gap between the first mother substrate and the second mother substrate.

A plurality of the step compensating members may be formed, and each of the step compensating members may have generally the same distance from the sealant.

A thickness of the step compensating members may increase with increasing size of a cell gap between the first mother substrate and the second mother substrate.

The method may further include (f) forming light blocking members having widths larger than that of the sealant, and formed between the first mother substrate and the second mother substrate so as to surround the display area.

In (c), a spacer may be further formed in the display area between the first mother substrate and the second mother substrate, wherein the spacer and the step compensating member may be made of the same material.

The step compensating member may comprise a metal.

In (c), color filters may be further formed in the display area on one of the first mother substrate and the second mother substrate, and the color filter and the step compensating member may comprise the same material.

In (c), light blocking member may be further formed in the display area of either the first mother substrate or the second mother substrate and partially overlapping the color filters, and the step compensating member may comprise the same material as the color filters and the light blocking members.

The step compensating member may comprise a general polygon, circle, or ellipse shape.

In the step (d), the dummy compensating member may be further formed among the panel regions between the first mother substrate and the second mother substrate.

Yet another exemplary embodiment of the present invention provides a liquid crystal display including: a first substrate and a second substrate each including a display area and a non-display area, the display areas positioned opposite to each other, and the non-display areas positioned opposite to each other; a plurality of data driver ICs formed at a side in the non-display area of the first substrate; a sealant positioned between the first substrate and the second substrate to surround the display areas; and a plurality of step compensating members overlapping the sealant, in which the step compensating member are each formed by stacking a plurality of metal layers, and the step compensating members are arranged along a side of the sealant, the step compensating members each positioned at a first distance from the sealant and the data driver ICs each positioned at a second distance from the sealant, the second distance different from the first distance, and ones of the step compensating members positioned in alternating manner with ones of the data driver ICs.

The liquid crystal display may further include gate lines and data lines formed in the display area of the first substrate, in which the step compensating member may be formed by stacking the layers of the gate lines and the data lines.

The liquid crystal display may further include a semiconductor layer formed in the display area of the first substrate, in which the step compensating members may comprise the semiconductor layer.

The sealant may include a generally ball-shaped spacer therein, and the diameter of the spacer may be from about 3.5 μm to about 4.5 μm.

Still another exemplary embodiment of the present invention provides a method of manufacturing a liquid crystal display, which includes: (a) receiving a first substrate and a second substrate each including a display area and a non-display area; (b) forming a plurality of step compensating members by stacking a plurality of metals on the first substrate; (c) forming a plurality of data driver ICs at a side of the non-display area of the first substrate; and (d) forming a sealant on one of the first substrate and the second substrate, to surround the display area, in which the step compensating members overlap the sealant and are arranged along a side of the sealant, the step compensating members each positioned at a first distance from the sealant and the data driver ICs each positioned at a second distance from the sealant, the second distance different from the first distance, and ones of the step compensating members positioned in alternating manner with ones of the data driver IC.

In (b), gate lines and data lines may be further formed in the display area of the first substrate, and the step compensating members may be formed by stacking the same layers as those of the gate lines and the data lines.

In (b), a semiconductor layer may be further formed in the display area of the first substrate, and the step compensating member may be formed by further stacking the semiconductor layer.

The sealant may include a generally ball-shaped spacer therein, and the diameter of the spacer may be from about 3.5 μm to about 4.5 μm.

The liquid crystal display and the method of manufacturing the liquid crystal display according to exemplary embodiments of the present invention can prevent or reduce staining due to differences in cell gap, by forming step compensating members at a portion extending from the space between data driver ICs.

Further, the liquid crystal display and the method of manufacturing the liquid crystal display according to exemplary embodiments of the present invention maintain a more uniform cell gap, by forming step compensating members in areas extending from the space between data driver ICs and a side on which the data driver ICs are not formed.

BRIEF DESCRIPTION OF THE DRAWINGS

FIG. 17 to FIG. 22 are cross-sectional views illustrating a method of manufacturing the liquid crystal display according to the third exemplary embodiment of the present invention.

DETAILED DESCRIPTION OF THE EMBODIMENTS

Figure 1:
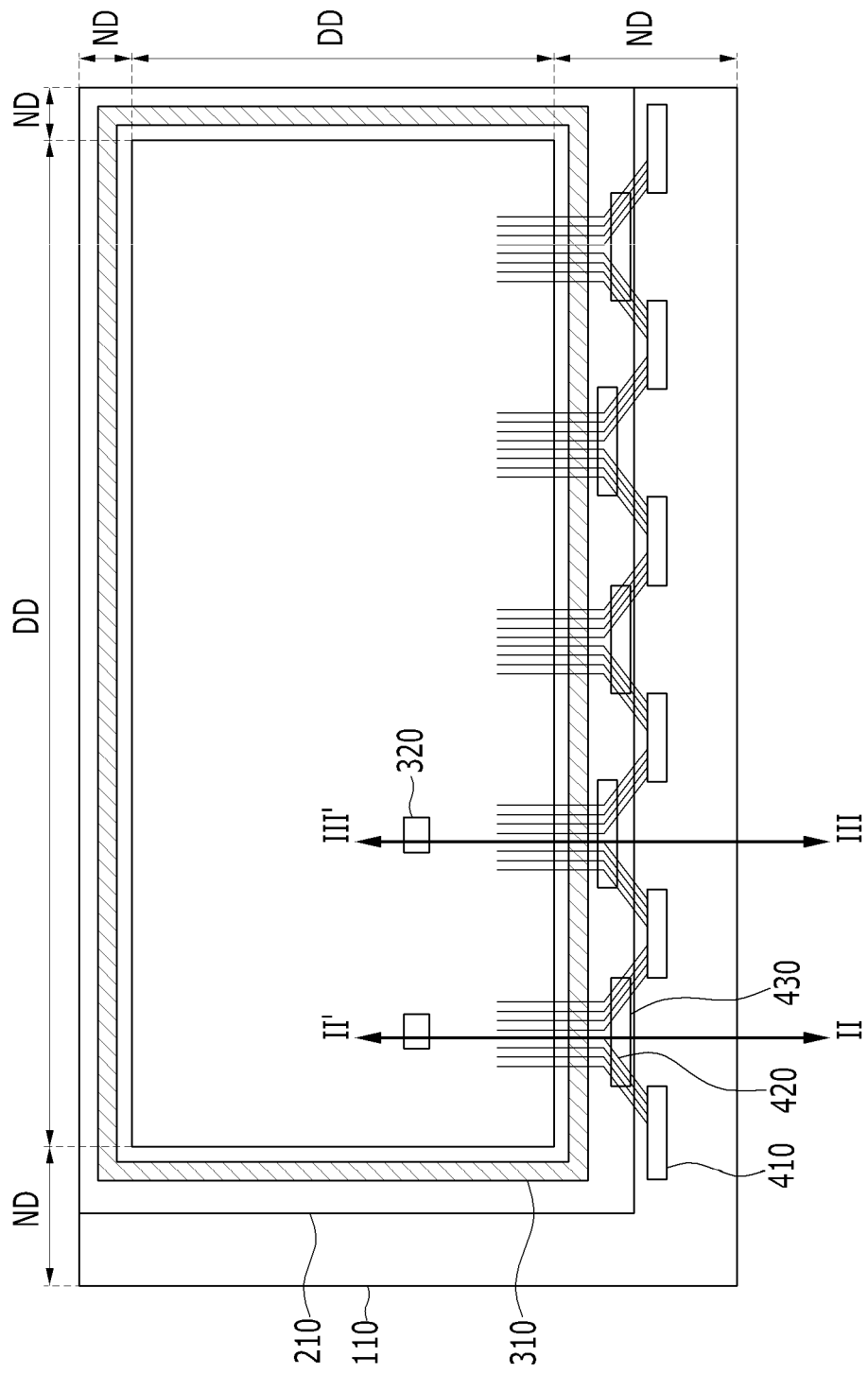
FIG. 1 is a top plan view of a liquid crystal display according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A liquid crystal display according to a first exemplary embodiment of the present invention is described first with reference to the accompanying drawings.

Figure 2:
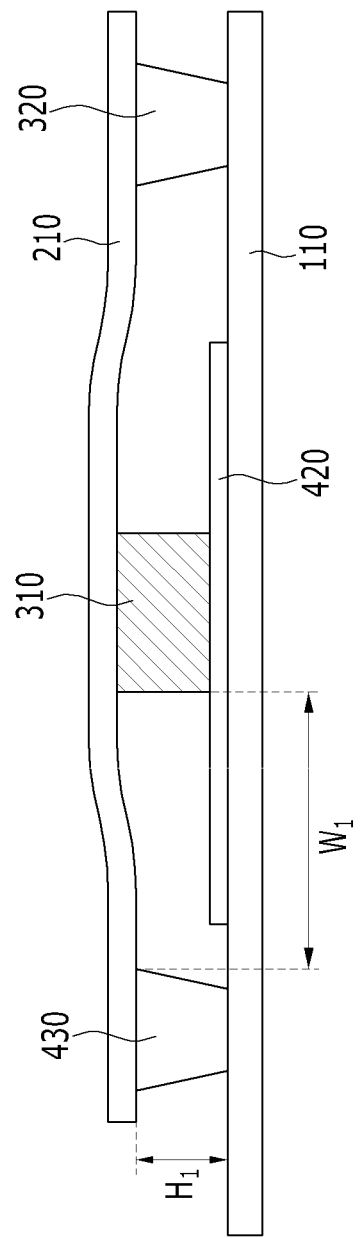
FIG. 2 is a cross-sectional view of the liquid crystal display according to the first exemplary embodiment of the present invention, taken along the line II-II' of FIG. 1.
Figure 3:
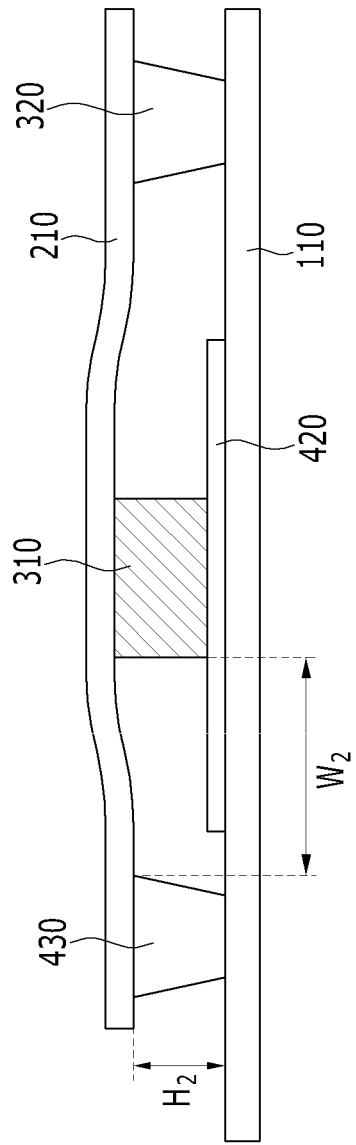
FIG. 3 is a cross-sectional view of the liquid crystal display according to the first exemplary embodiment of the present invention, taken along the line III-III' of FIG. 1.

FIG. 1 is a top plan view of a liquid crystal display according to a first exemplary embodiment of the present invention, FIG. 2 is a cross-sectional view taken along the line II-II' of FIG. 1, and FIG. 3 is a cross-sectional view taken along the line III-III' of FIG. 1.

A liquid crystal display according to the first exemplary embodiment of the present invention includes a first substrate 110 and a second substrate 210 which are assembled or coupled together, and is divided into a display area DD and a non-display area ND. The non-display area ND surrounds the display area DD.

A plurality of data driver ICs 410 are formed in the non-display area ND of the first substrate 110. The plurality of data driver ICs 410 is arranged at predetermined distances along a side on the first substrate 110. The distances between the individual data driver ICs 410 may be different.

Data voltage supply lines 420 connected to the data driver ICs 410 are formed on the first substrate 110. A plurality of data voltage supply lines 420 are connected to one data driver IC 410, and extend from the data driver IC 410 to the display area DD of the first substrate 110, which lies within the space between the data driver ICs 410. That is, the data voltage supply line 420 may be formed to extend in a first direction from the data driver IC 410 to the non-display area ND of the first substrate 110, and then to bend in a second direction from the non-display area ND to the display area DD of the first substrate 110. However, the present invention is not limited thereto, and the data voltage supply line may bend several times in any directions, and/or may also be, or include, one or more curves.

Recently, efforts have been made to reduce the number of data driver ICs 410 and to increase the number of data voltage supply lines 420, typically driven by the desire to implement high resolution. Therefore, portions of the first substrate 110, such as the area between the data driver ICs and the display area DD, contain a large number of data voltage supply lines 420. These portions will thus commonly have a larger cell gap, due to the vertical space taken up by the supply lines 420.

A sealant 310 is formed between the first substrate 110 and the second substrate 210, to surround the display area DD. Though not shown, a liquid crystal layer is formed between the first substrate 110 and the second substrate 210, and liquid crystal molecules of the liquid crystal layer are retained in the display area DD between the first substrate 110 and the second substrate 210 by the sealant 310.

Step compensating members 430 are formed in the non-display area ND, on either the first substrate 110 or the second substrate 210. The step compensating members 430 are positioned outside the sealant 310. Most of the data voltage supply lines 420 cross a specific area under the sealant 310, and the step compensating members 430 are positioned along the same line as the specific area that most of the data voltage supply lines 430 cross. Therefore, it is possible to decrease the cell gap between the first substrate 110 and the second substrate 210 despite the presence of the data voltage supply lines 420. That is, it is possible to decrease the cell gap inside the sealant 310 by increasing the cell gap around the sealant 310.

The distances of the step compensating members 430 from the sealant 310 may vary. The cross-sections of the leftmost step compensating member 430 and the second step compensating member 430 from the left are described hereafter with reference to FIG. 2 and FIG. 3. The distance W1 from the sealant 310 to the leftmost step compensating member 430 is smaller than the distance W2 from the sealant 310 to the second-to-the-left step compensating member 430. In this configuration, the thickness H1 of the leftmost step compensating member 430 is about the same as the thickness H2 of the next-to-the-left step compensating member 430.

More data voltage supply lines 420 cross the portion where the leftmost step compensating member 430 is formed than the portion where the second-to-left step compensating member 430 is formed in the first exemplary embodiment of the present invention. The more the data voltage supply lines 420 cross the unit area, the larger the cell gap becomes, such that the cell gap is more reduced by forming the step compensating member 430 closer to the sealant 310.

That is, it is possible to keep the entire cell gap uniform by making the thicknesses of the step compensating member 430 the same and making the distance from the sealant 310 to the step compensating member 430 different in accordance with differences in cell gap. In this configuration, the larger the cell gap between the first substrate 110 and the second substrate 210, the farther the step compensating member 430 is formed from the sealant 310. That is, the distance of the step compensating member 430 to the sealant 310 decreases with increasing cell gap.

Put differently, when the second substrate 210 is affixed to the first substrate 110, the added volume occupied by the data voltage supply lines 420 causes the second substrate 210 to bend or deform in areas near the sealant 310, as shown (note that, although only the second substrate 210 is shown as being deformed, in actuality, any one or both of the first and second substrates 110, 210 may deform to varying degrees). As the amount of deformation increases with the number of data voltage supply lines 420, greater numbers of supply lines 420 result in greater deformation of substrate 210 (and/or substrate 110), so that step compensating member 430 must be placed closer to the sealant 310 to compensate much-more for the amount of deformation. Conversely, fewer supply lines 420 means less deformation of substrate 210, so that step compensating member 430 can be placed further from sealant 310. The step compensating members 430 thus help to make deformation of the substrates 110, 210 more localized by pulling the substrates 110, 210 toward each other, so that variations in cell gap generated in areas around the sealant 310 may be compensated for.

Although the step compensating member 430 is formed in rectangles in the drawings, the present invention is not limited thereto and is may be formed in various shapes, such as a polygon, a circle, and an ellipse.

A spacer 320 may also be formed in the display area between the first substrate 110 and the second substrate 210. The spacer 320 is formed to keep the cell gap between the first substrate 110 and the second substrate 210 more uniform.

The step compensating member 430 can be made of the same material as the spacer 320. For example, the step compensating member 430 may be made of metal.

Though not shown, the display area DD of the first substrate 110 or the second substrate 210 includes a plurality of pixel areas. Color filters are formed in the pixel areas, and light blocking members are formed at the interfaces of the pixel areas, partially overlapping the color filters. The step compensating member 430 may be made of the same material as the color filter, or may be made of the same materials as overlapping color filters and light blocking members.

Though not shown, the light blocking member may be further formed in the non-display area ND. In this configuration, the light blocking member may be wider than the sealant 310, surrounding the display area DD in the area between the first substrate 110 and the second substrate 210.

A liquid crystal display according to a second exemplary embodiment of the present invention is described hereafter with reference to the accompanying drawings.

Figure 4:
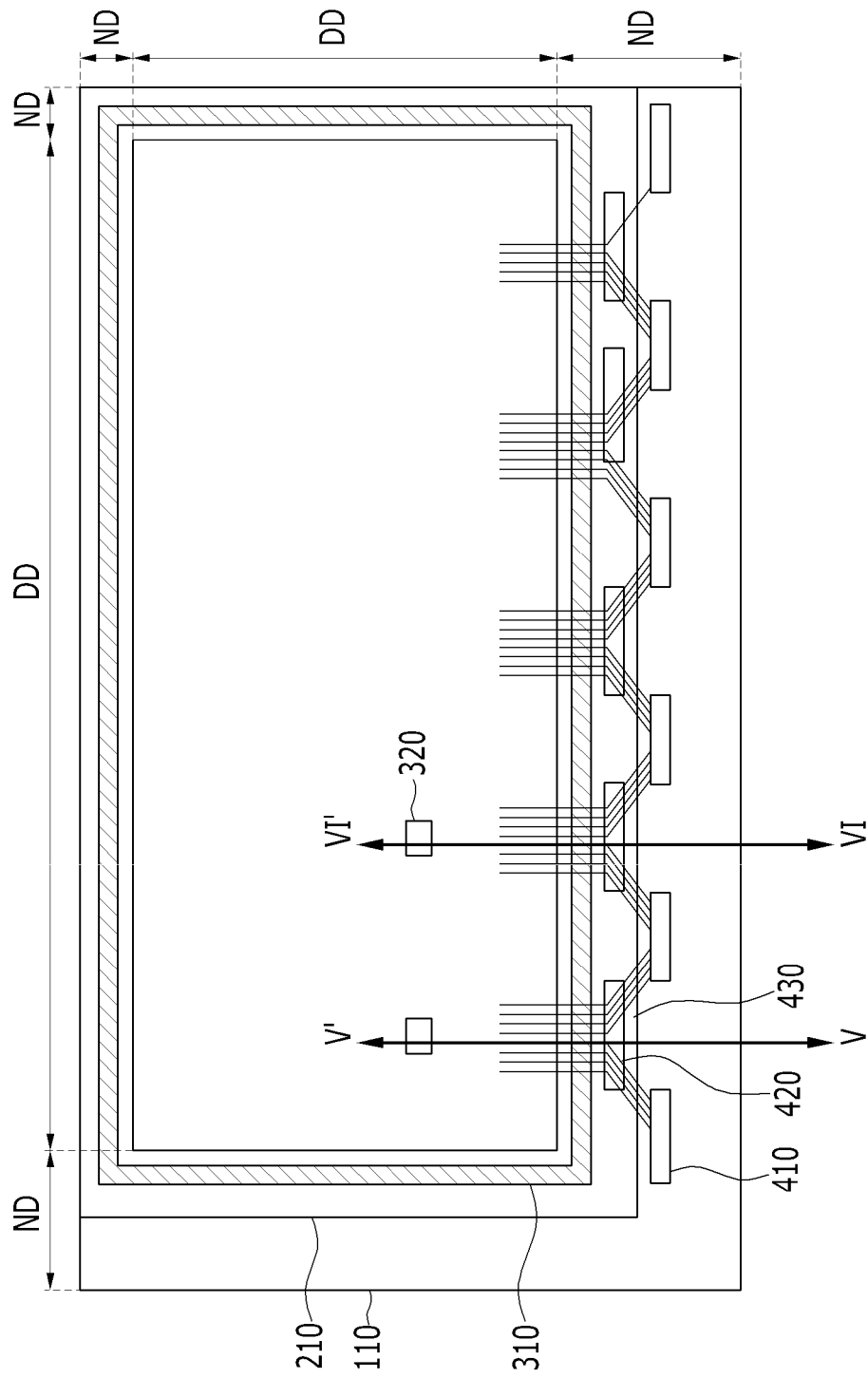
FIG. 4 is a top plan view of a liquid crystal display according to a second exemplary embodiment of the present invention.
Figure 5:
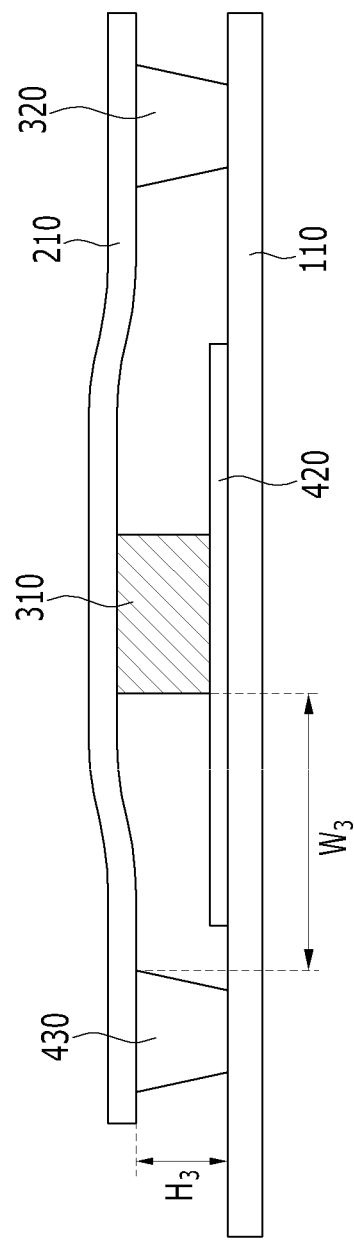
FIG. 5 is a cross-sectional view of the liquid crystal display according to the second exemplary embodiment of the present invention, taken along the line V-V' of FIG. 4.
Figure 6:
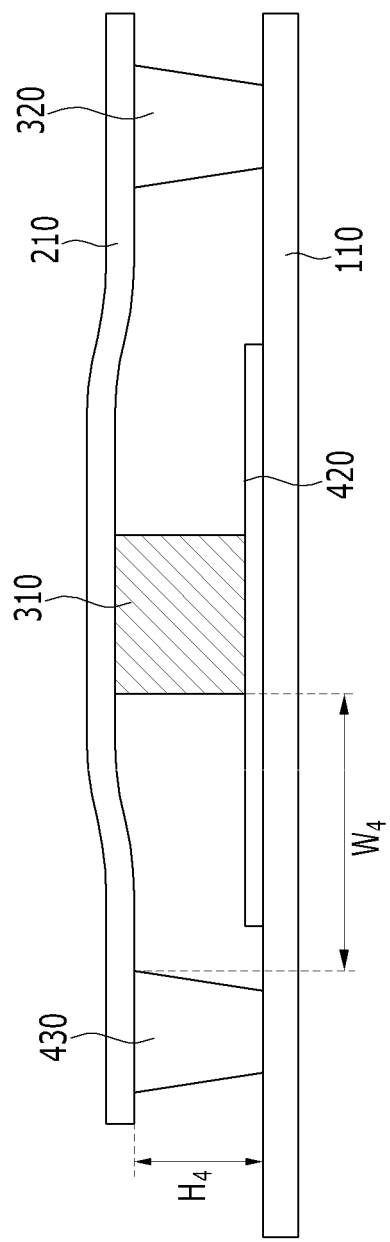
FIG. 6 is a cross-sectional view of the liquid crystal display according to the second exemplary embodiment of the present invention, taken along the line VI-VI' of FIG. 4.

FIG. 4 is a top plan view of a liquid crystal display according to a second exemplary embodiment of the present invention, FIG. 5 is a cross-sectional view taken along the line V-V' of FIG. 4, and FIG. 6 is a cross-sectional view taken along the line VI-VI' of FIG. 4.

A large portion of the configuration of the liquid crystal display of this second exemplary embodiment is the same as the liquid crystal display according to the first exemplary embodiment; therefore, largely only differences between the two are described.

The liquid crystal display according to the second exemplary embodiment is the same as that of the first exemplary embodiment in that the step compensating member 430 is formed outside the sealant 310 in the non-display area, and can be formed on either the first substrate 110 or the second substrate 210.

However, unlike the first exemplary embodiment, the distances from the sealant 310 to the step compensating members 430 may be the same. The cross-sections of the leftmost step compensating member 430 and the second step compensating member 430 from the left are described hereafter with reference to FIG. 5 and FIG. 6. The distance W3 from the sealant 310 to the leftmost step compensating member 430 is substantially the same as the distance W4 from the sealant 310 to the second-to-the-left step compensating member 430. In this configuration, the thickness H3 of the leftmost step compensating member 430 is smaller than the thickness H4 of the second-to-the-left step compensating member 430.

More data voltage supply lines 420 cross the portion where the leftmost step compensating member 430 is formed than the portion where the left second step compensating member 430 is formed.

That is, it is possible to keep the entire cell gap more uniform by making the distances from the sealant 310 to the step compensating members 430 the same and making the thicknesses of the step compensating members 430 different in accordance with difference in cell gap. In this configuration, the larger the cell gap between the first substrate 110 and the second substrate 210, the greater the thickness of the step compensating members 430.

A method of manufacturing the liquid crystal display according to the first exemplary embodiment of the present invention is described hereafter with reference to the accompanying drawings.

FIG. 7 to FIG. 10 are top plan views illustrating a method of manufacturing the liquid crystal display of the above-described first exemplary embodiment of the present invention.

The method begins with preparing and/or receiving a first mother substrate 102 and a second mother substrate 202.

Figure 7:
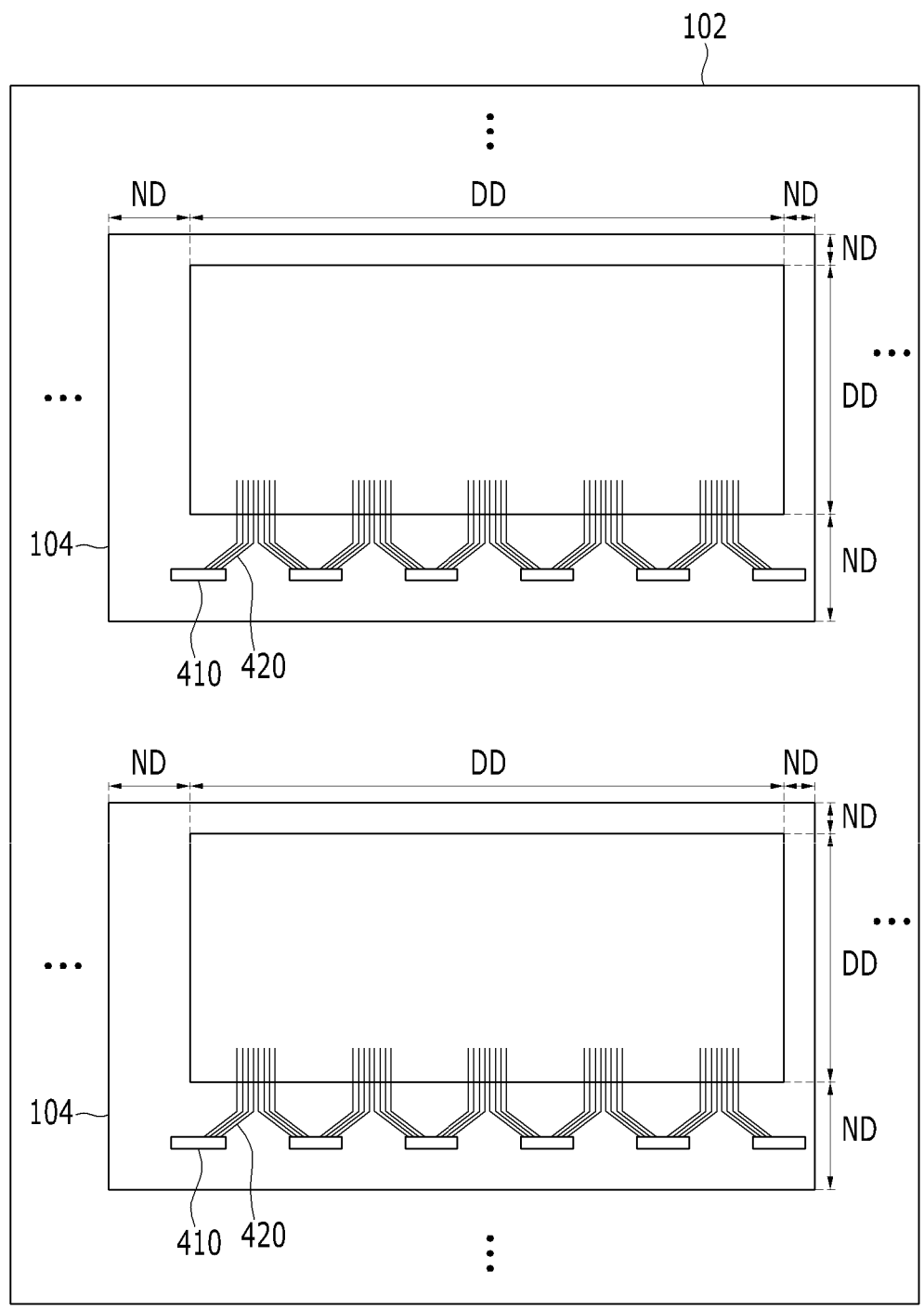
FIG. 7 to FIG. 10 are top plan views illustrating a method of manufacturing the liquid crystal display according to the first exemplary embodiment of the present invention.

As shown in FIG. 7, the first mother substrate 102 includes a plurality of panel regions 104 that each include a display area DD and a non-display area ND. In this configuration, the non-display area ND surrounds the display area DD.

A plurality of data driver ICs 410 are formed in the non-display area ND on the first mother substrate 102. A plurality of data voltage supply lines 420 are connected with the data driver ICs 410 and extended to the display area DD of the first mother substrate 102.

Figure 8:
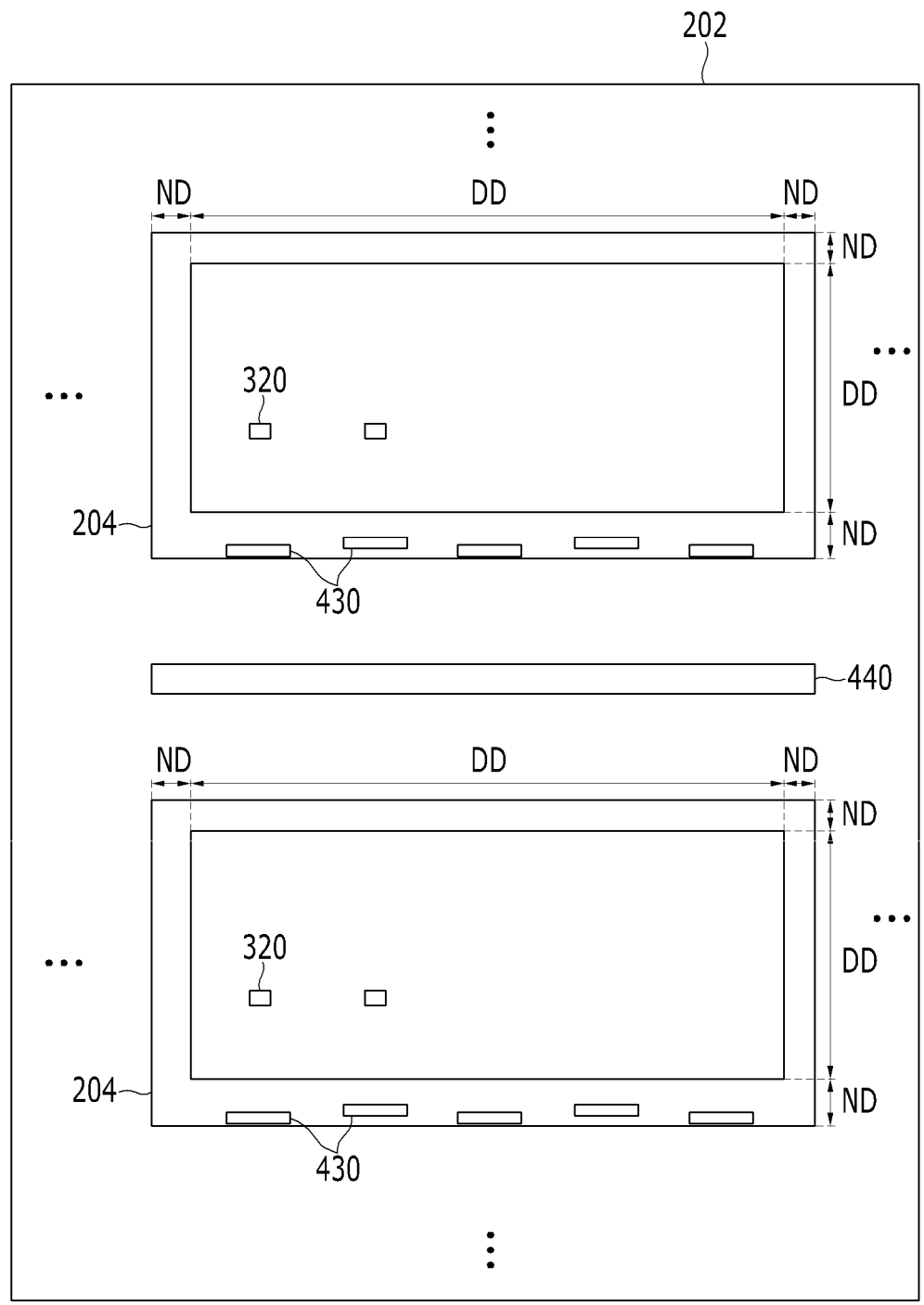

As shown in FIG. 8, the second mother substrate 202 includes a plurality of panel regions 204, where the panel regions 204 each include a display area DD and a non-display area ND. In this configuration, the non-display area ND surrounds the display area DD. The panel region 104 of the first mother substrate 102 and the panel region 204 of the second mother substrate 202 correspond to each other. However, the size of the panel region of the first mother substrate 102 and the size of the panel region of the second mother substrate 202 may not necessarily be the same. That is, the size of the panel region of the first mother substrate 102 may be larger than the size of the panel region of the second mother substrate 202. The display area DD and the non-display area ND of the first mother substrate 102 correspond to the display area DD and the non-display area ND of the second mother substrate 202.

The step compensating members 430 are formed in the non-display area ND to be positioned between the data driver ICs 410 and the display area DD. Most of the data voltage supply lines 420 cross a specific area under the sealant 310, and the step compensating members 430 are positioned along the same line as the specific area that most of the data voltage supply lines 430 cross, i.e. inline with the portions of supply lines 430 that cross under sealant 310.

The step compensating members 430 are formed in the panel region 204 of the second mother substrate 202.

The spacer 320 may be further formed in the display area DD of the second mother substrate 202, during the process of forming the step compensating members 430. More specifically, in this configuration, the step compensating members 430 and the spacer may be made of the same material and during the same process.

Further, during the process of forming the step compensating members 430, a dummy step compensating member 440 may also be formed between the panel regions 204 on the second mother substrate 202. In this configuration, the dummy step compensating members 440 and the step compensating members 430 may be made of the same material during the same process.

Although the step compensating members 430 and the spacer 320 are formed on the second mother substrate 202, the present invention is not limited thereto and either one or both of the step compensating members 430 and the spacer 320 may be formed on the first mother substrate 102.

Figure 9:
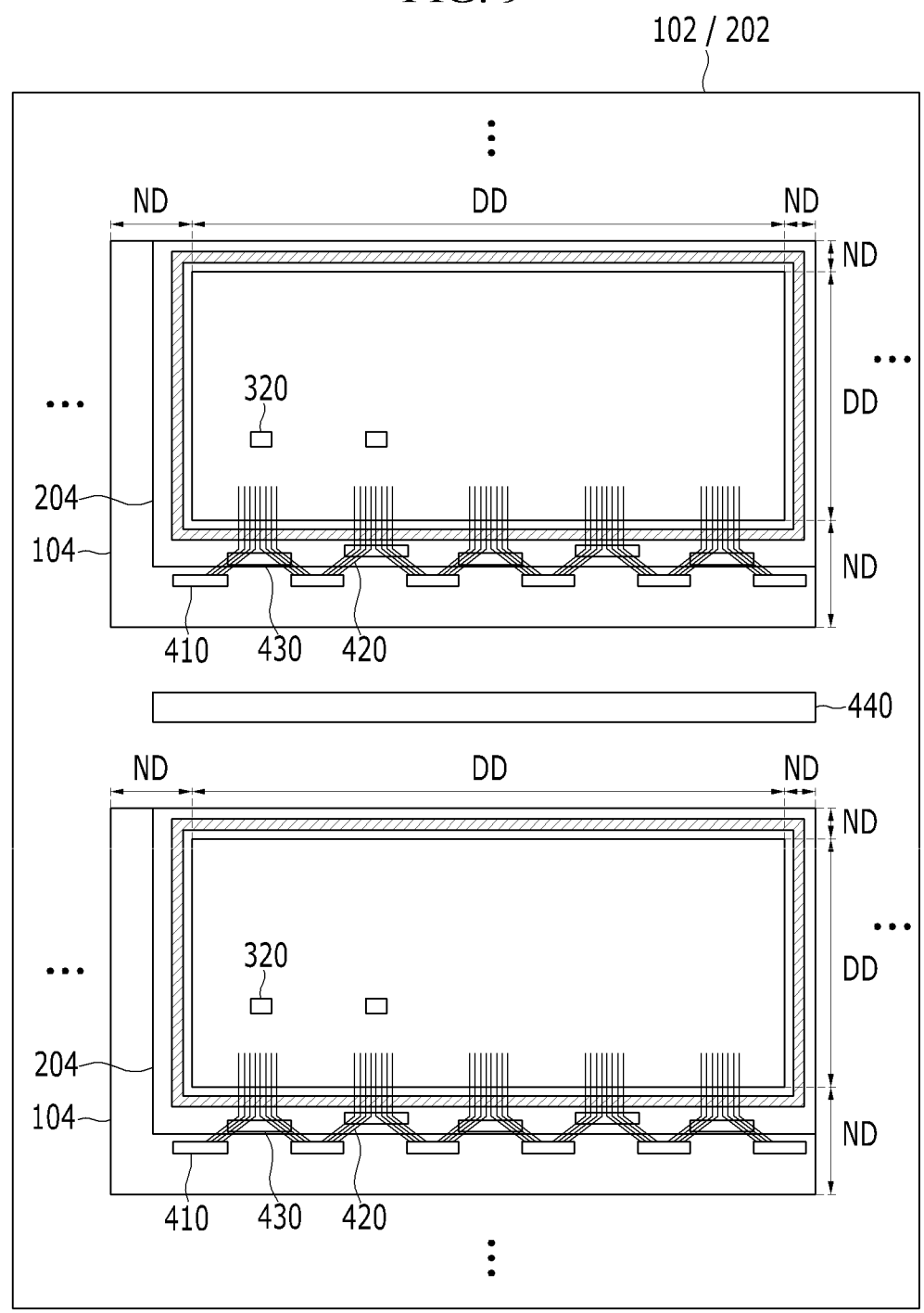

As shown in FIG. 9, a sealant 310 is formed to surround the display area on the first mother substrate 102.

Thereafter, the second mother substrate 202 is positioned to correspond to the first mother substrate 102 (i.e., corresponding display areas of the two substrates 102, 202 are aligned with each other) and assembled, whereupon the sealant 310 is hardened.

Figure 10:
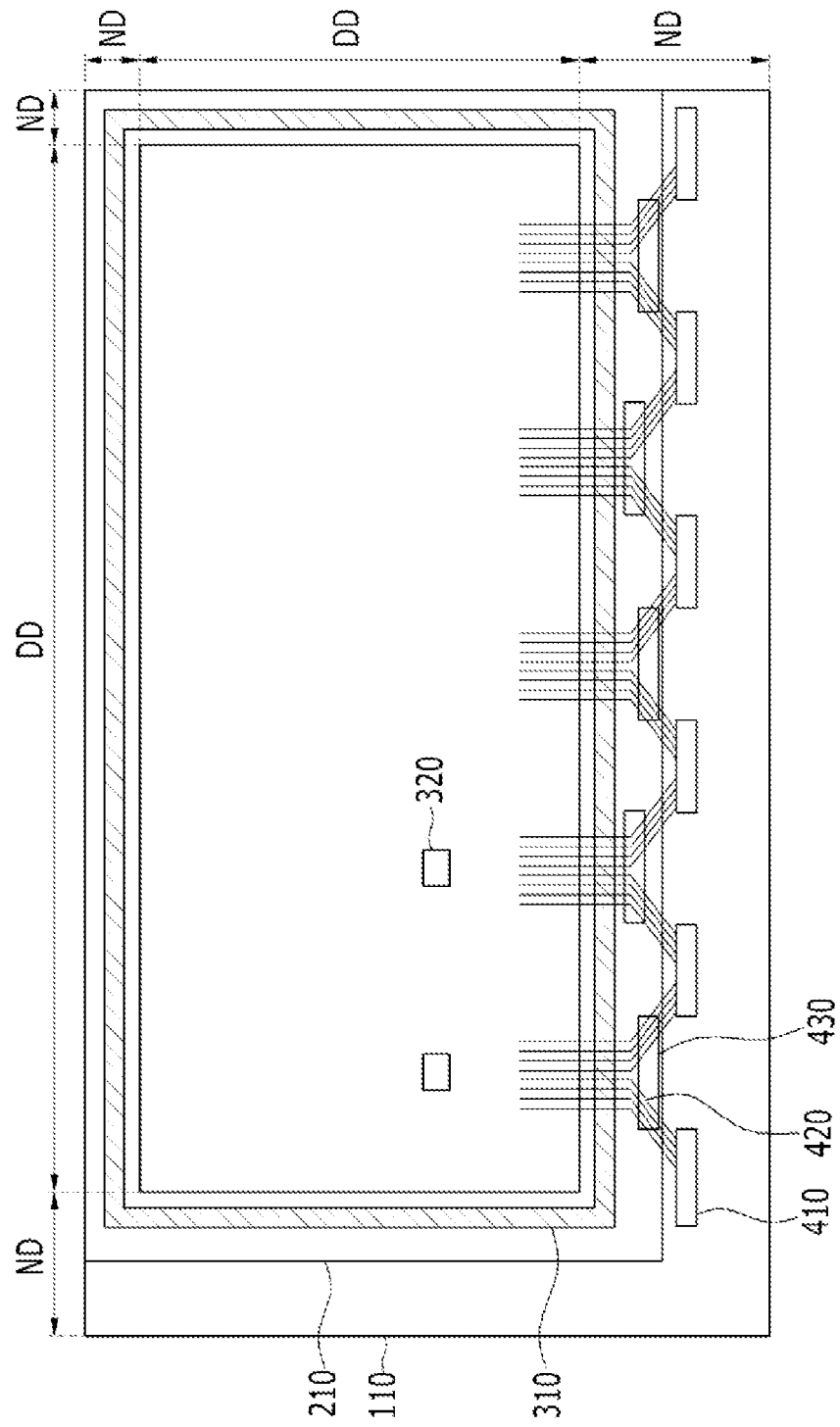

The first mother substrate 102 is separated along the panel region 104 and the second mother substrate 202 is separated from the panel region 204 by scribing, thereby completing the liquid crystal display shown in FIG. 10.

In this configuration, since the step compensating members 430 are formed in the panel region 204 of the second mother substrate 202, they remain on the liquid crystal display even after the scribing. However, since the dummy step compensating members 440 are formed between the panel regions 204, that is, outside the panel regions 204, they are removed from the liquid crystal display after the scribing.

The step compensating members 430 are positioned outside the sealant. The step compensating members 430 may be formed with approximately the same thickness, and the distances from the sealant 310 may be constant, or may vary. In this configuration, the larger the cell gap when the first mother substrate 102 and the second mother substrate 202 are assembled, the closer the step compensating members 430 are formed to their associated sealant 310.

Alternatively, the step compensating members 430 may each be formed at approximately the same distance from the sealant 310, but with different thicknesses. In this configuration, the larger the desired cell gap, the greater the thickness of the step compensating members 430.

Although the step compensating members 430 are formed in rectangles in the drawings, the present invention is not limited thereto and they may be formed in any shape, such as a polygon, a circle, and an ellipse.

Although the step compensating members 430 and the spacer 320 are made of the same material in this example, the present invention is not limited thereto and the step compensating members 430 may be made of any suitable material. For example, the members 430 may be made of metal.

Though not shown, the display area DD of the first mother substrate 102 or the second mother substrate 202 includes a plurality of pixel areas, and color filters may be further formed in these pixel areas in the process of forming the step compensating members 430. Further, light blocking members may be formed at the interfaces of the pixel areas, and partially overlapping the color filters if desired. In this configuration, the step compensating members 430 may be made of the same material as the color filters, or may be formed by stacking the same materials as the color filters and the light blocking members.

Though not shown, the light blocking members may be further formed in the non-display area ND. In this configuration, the light blocking member may be wider than the sealant 310, surrounding the display region DD between the first mother substrate 102 and the second mother substrate 202.

A method of manufacturing the liquid crystal display according to a second exemplary embodiment of the present invention is described hereafter with reference to the accompanying drawings.

FIG. 11 to FIG. 14 are top plan views illustrating a method of manufacturing the liquid crystal display according to the second exemplary embodiment of the present invention.

A large portion of the configuration of this embodiment is the same as that of the first exemplary embodiment; therefore the same configuration is not described and, largely, only differences are described.

Figure 11:
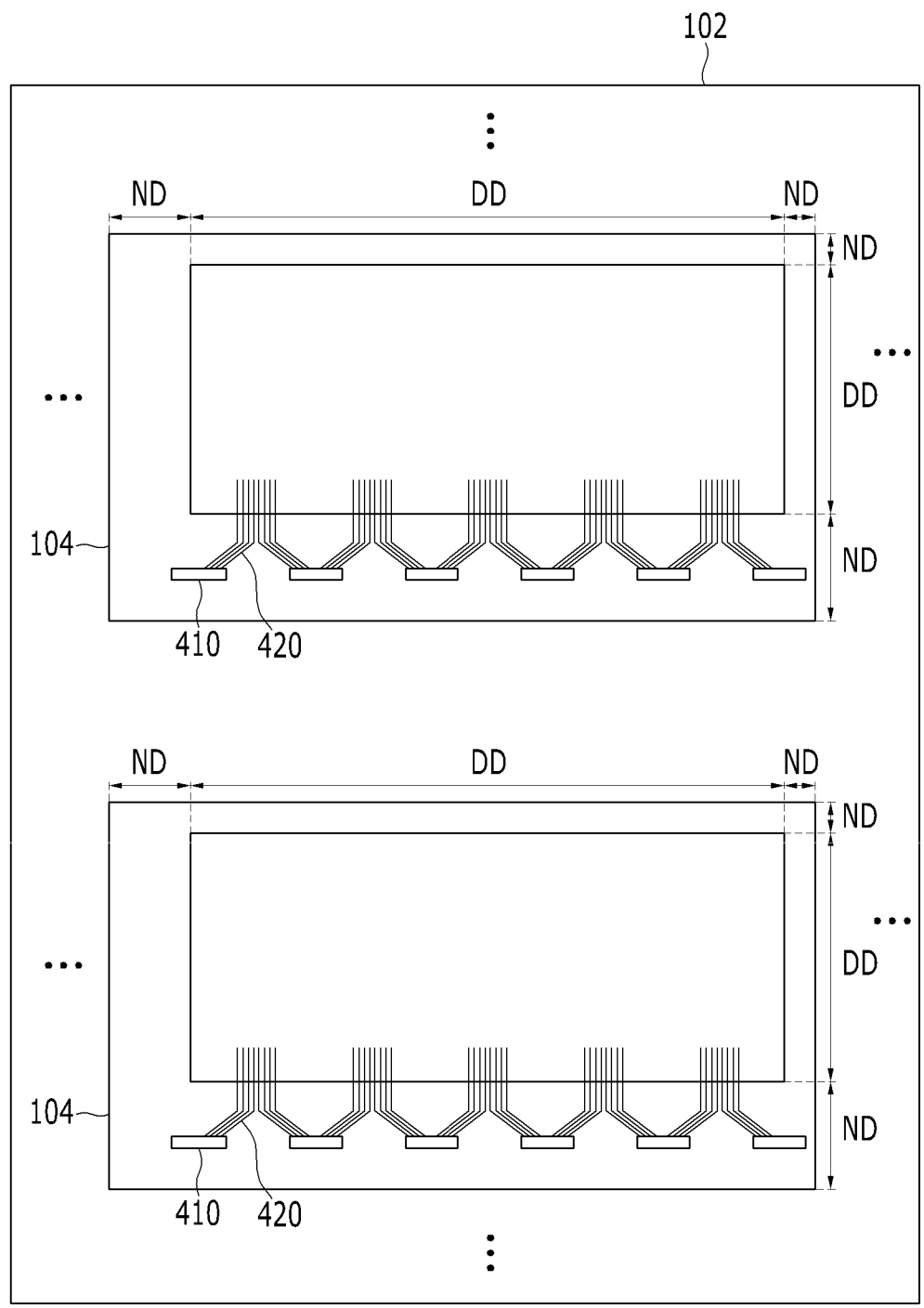
FIG. 11 to FIG. 14 are top plan view illustrating a method of manufacturing the liquid crystal display according to the second exemplary embodiment of the present invention.

The method of manufacturing the liquid crystal display according to the second exemplary embodiment of the present invention is the same as that of the first exemplary embodiment in that a plurality of data driver ICs 410 and a plurality of data voltage supply lines 420 are formed, as shown in FIG. 11.

Figure 12:
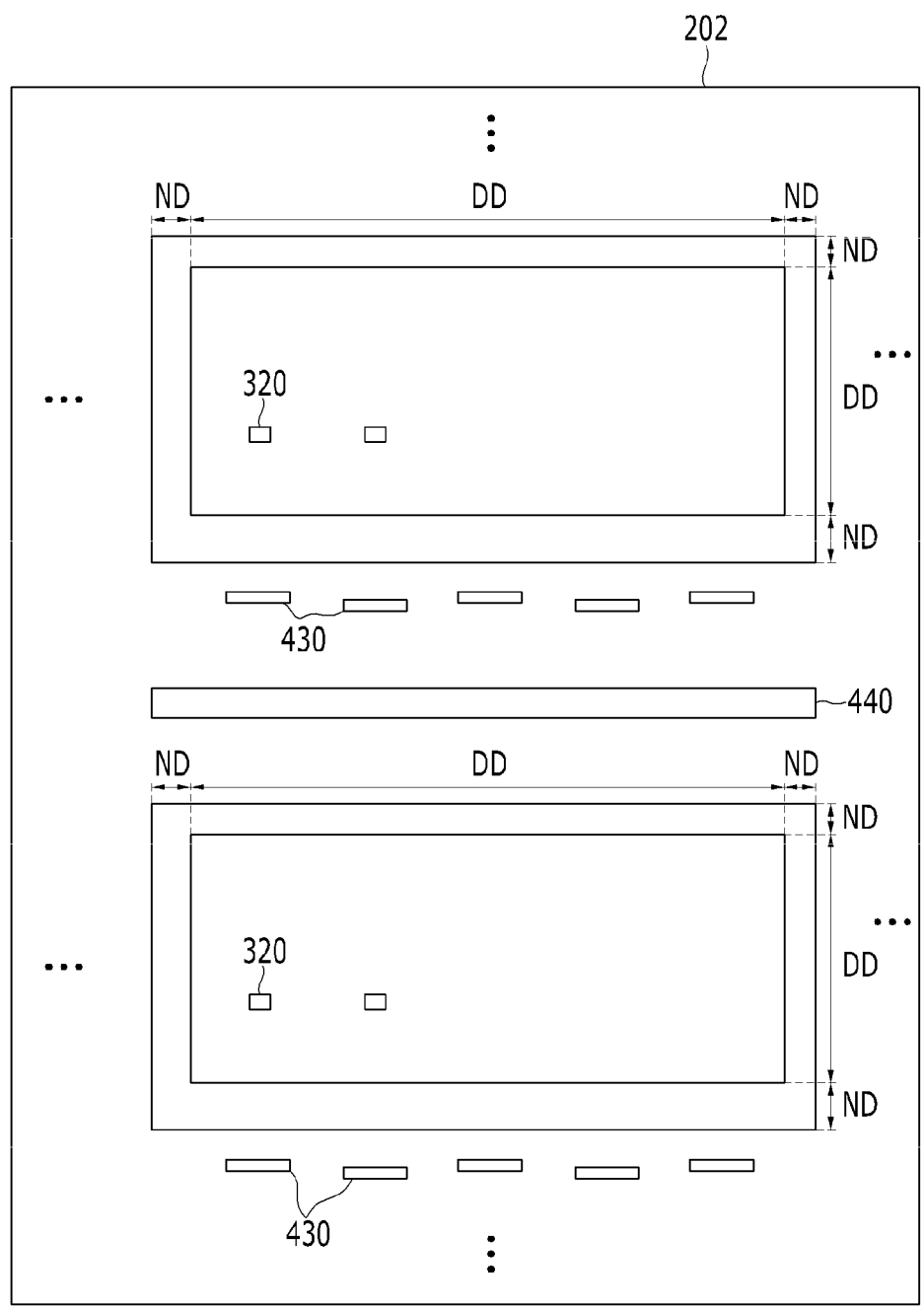

As shown in FIG. 12, step compensating members 430 are formed, similar to the first embodiment. However, unlike the first exemplary embodiment, the step compensating members 430 are formed outside the panel region 204 of the second mother substrate 202.

Figure 13:
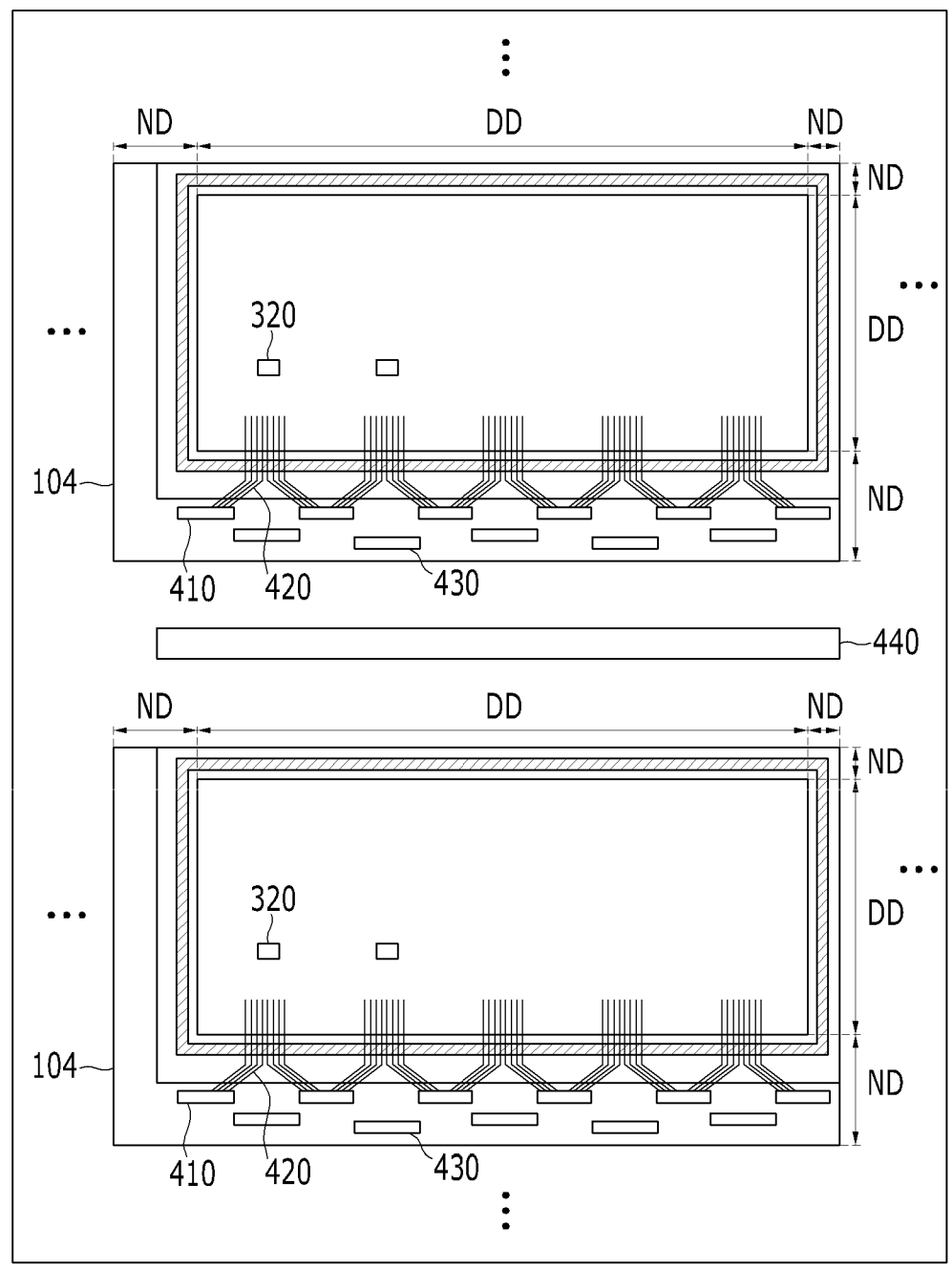

As shown in FIG. 13, after the sealant 310 is formed, the first mother substrate 102 and the second mother substrate 202 are assembled and then the sealant 310 is hardened, as in the previous embodiment.

Figure 14:
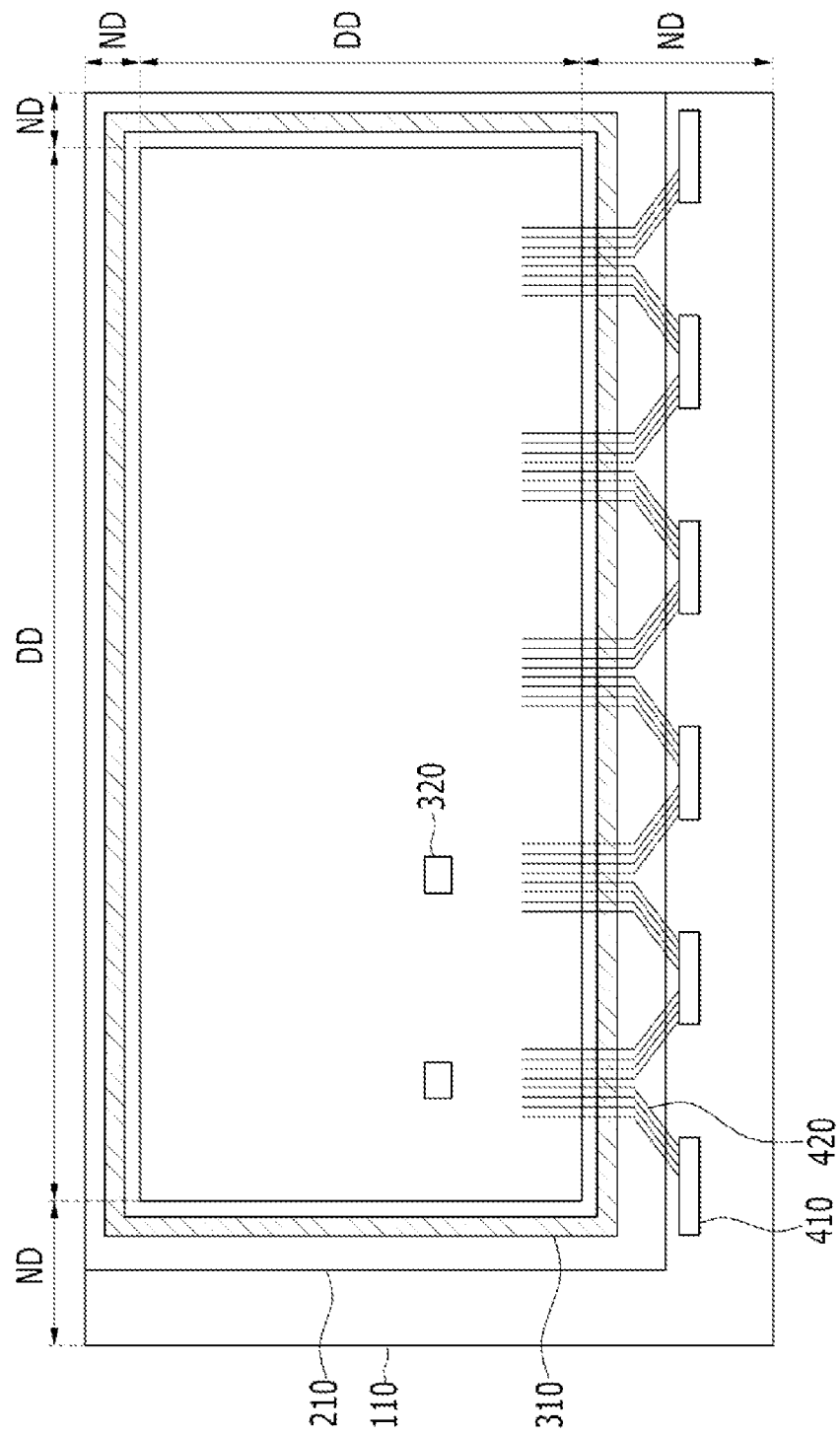

The first mother substrate 102 is separated along the panel region 104 and the second mother substrate 202 is separated from the panel region 204 by scribing, thereby completing the liquid crystal display shown in FIG. 14.

In this configuration, since the step compensating members 430 and the dummy step compensating members 440 are formed outside the panel region 204 of the second mother substrate 202, they are removed from the liquid crystal display after the scribing. The scribing is performed after the sealant 310 is hardened, and the cell gap does not substantially change after the sealant 310 is hardened, such that the cell gap can be kept uniform throughout the liquid crystal display even though the step compensating members 430 and the dummy step compensating members 440 are removed.

As described above, certain areas of the display have a larger cell gap due to the large amount of data voltage supply lines in those areas. The step compensating members are formed in those areas, so as to maintain a more uniform cell gap throughout the liquid crystal display.

When the liquid crystal display according to the first exemplary embodiment of the present invention is in operation, it is possible to reduce or prevent stains under the liquid crystal display due to the presence of data voltage supply lines, by forming the step compensating members of the present invention.

A liquid crystal display according to a third exemplary embodiment of the present invention is described hereafter with reference to the accompanying drawings.

Figure 15:
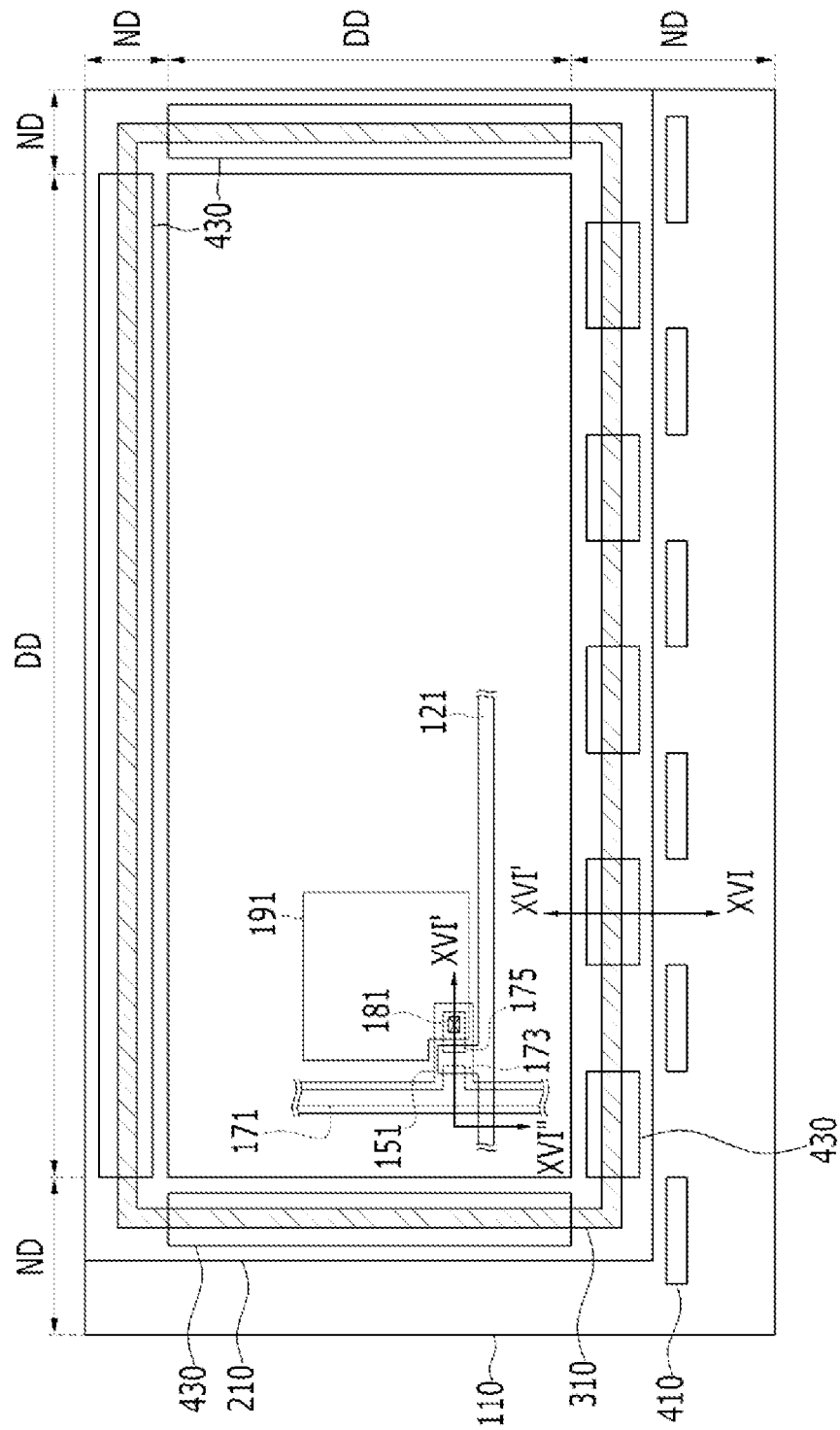
FIG. 15 is a top plan view of a liquid crystal display according to a third exemplary embodiment of the present invention.
Figure 16:
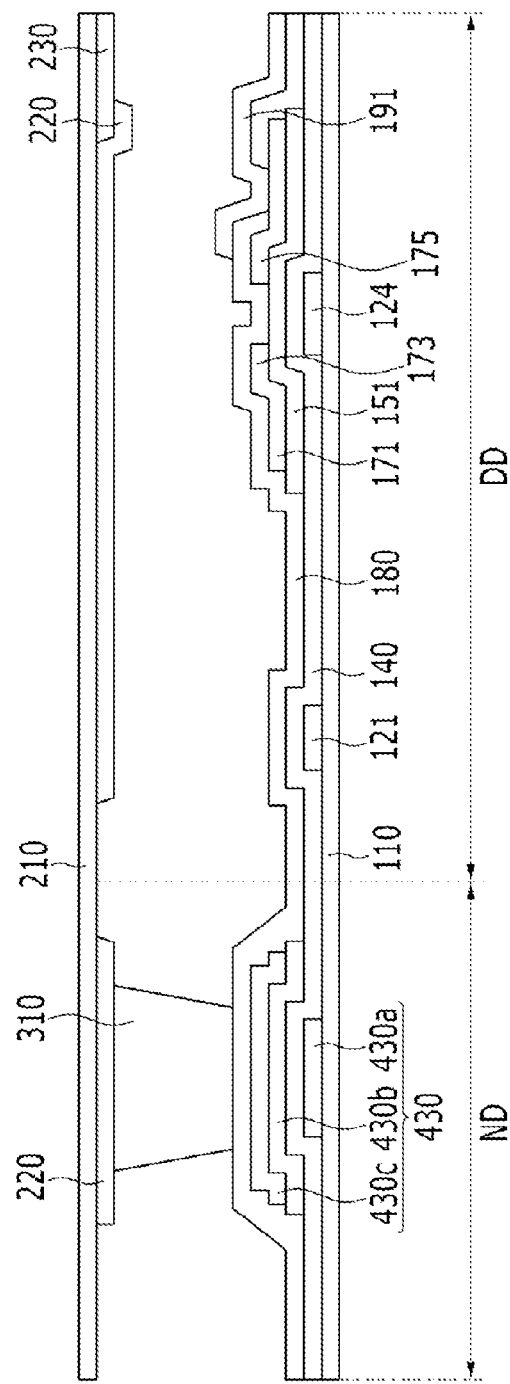
FIG. 16 is a cross-sectional view of the liquid crystal display according to the third exemplary embodiment of the present invention, taken along the line XVI-XVI' of FIG. 16.

FIG. 15 is a top plan view of a liquid crystal display according to a third exemplary embodiment of the present invention, and FIG. 16 is a cross-sectional view taken along the line XVI-XVI' of FIG. 15.

A liquid crystal display according to the third exemplary embodiment of the present invention includes a first substrate 110 and a second substrate 210 which are assembled, and is divided into a display area DD and a non-display area ND. The non-display area ND surrounds the display area DD.

A plurality of data driver ICs 410 is formed on the first substrate 110 in the non-display area ND. The data driver ICs 410 are arranged at predetermined distances along a side on the first substrate 10. The distances between the data driver ICs 410 may be different.

A sealant 310 is formed between the first substrate 110 and the second substrate 210 to surround the display area DD. Though not shown, a liquid crystal layer is formed between the first substrate 110 and the second substrate 210, and liquid crystal molecules of the liquid crystal layer are confined in the display area DD between the first substrate 110 and the second substrate 210 by the sealant 310.

A plurality of step compensating members 430 is formed in the space between the display area DD and the data driver ICs 410 inside the first substrate 110 to correspond to areas where the data driver ICs 410 are not formed, and overlapping the sealant 310. That is, the step compensating members 430 are disposed between the data driver ICs 410, so as to generally form a zigzag pattern with the data driver ICs 410.

Pixel areas are generally defined by gate lines 121 and data lines 171 which cross each other in the display area DD of the first substrate 110. Gate electrodes 124 protruding from the gate lines 121, a semiconductor layer 151 formed on the gate electrodes 124, source electrodes 173 and drain electrodes 175 protruding from the data lines 171 and spaced apart from the source electrodes 173 on the semiconductor layer 151 are further formed. A gate insulating layer 140 is formed on the gate lines 121 and gate electrodes 124, and a passivation layer 180 is formed on the data lines 171, the source electrodes 173, and the drain electrodes 175. Contact holes 181 are formed through the passivation layer 180 to partially expose the drain electrodes 175, and pixel electrodes 191 are formed in the pixel areas to be connected with the drain electrodes 175 through the contact holes 181.

The step compensating member 430 may be formed by stacking a plurality of metals, or metal layers. For example, the step compensating member 430 may be formed by stacking a first pattern 430a made of the same material as the gate lines 121, a second pattern 430b made of the same material as the semiconductor layer 151, and a third pattern 430c made of the same material as the data lines 171. Unlike that shown in FIG. 16, the step compensating member 430 may also be formed by stacking the first patterns 430a and the third pattern 430c.

In this configuration, the step compensating members 430 are formed by stacking the same metals. That is, the step compensating members are formed with the same thickness, such that the cell gap is substantially uniform throughout the liquid crystal display. Therefore, a portion of the step compensating member 430 is formed to allow the same metal layer as the gate line 121 or the data line 171 to transmit signals, where the other portion is formed to keep a uniform cell gap and floats.

The entire cell gap can be increased by additionally forming the metal layer to keep the cell gap uniform, as described above. It is preferable to make the diameters of any ball-shaped spacers (not shown) in the sealant 310, if present, smaller than that in the liquid crystal displays of the related art, in order to prevent potential risks. In this configuration, the diameter of a spacer in the sealant 310 may be from about 3.5 μm to about 4.5 μm.

Color filters 230 may be formed in the pixel areas of the second substrate 210 and light blocking members 220 may be formed at the interfaces of the pixel areas, partially overlapping the color filters 230.

A method of manufacturing a liquid crystal display according to a third exemplary embodiment of the present invention is described hereafter with reference to the accompanying drawings.

FIG. 17 to FIG. 22 are cross-sectional views illustrating a method of manufacturing a liquid crystal display according to the third exemplary embodiment of the present invention. FIG. 15 serves as a plan view of the liquid crystal display according to the third exemplary embodiment of the present invention.

A first substrate 110 and a second substrate 210 are first prepared or received. The first substrate 110 and the second substrate 210 each include a display area DD and a non-display area ND.

Figure 17:
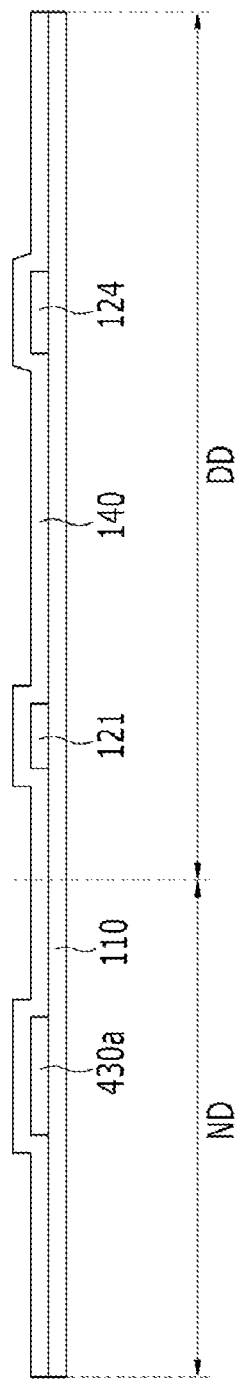

As shown in FIG. 17, gate lines 121 and gate electrodes 124 protruding from the gate lines 121 are formed in predetermined directions in the display area of the first substrate 110, and a first pattern 430a is formed in the non-display area of the first substrate 110. The first pattern 430a can be made of the same material as the gate line 121.

Next, a gate insulating layer 140 is formed on the entire surface of the first substrate 110 including over the gate line 121, the gate electrode 124, and the first pattern 430a.

As shown in FIG. 18, a semiconductor layer 151 is formed on the gate electrode 124, and a second pattern 430b is made of the same material as the semiconductor layer 151 on the first pattern 430a. Further, data line 171, the source electrode 173, and the drain electrode 175 are formed. The source electrode 173 and drain electrode 175 are formed spaced apart from each other on the semiconductor layer 175. The third pattern 430c is formed on the second pattern 430b, and may be made of the same material as the data line 171.

That is, the semiconductor layer 151 and the second pattern 430b are formed on the same layer, and the data line 171, the source electrode 173, the drain electrode 175, and the third pattern 430c are formed on the same layer.

In this configuration, the semiconductor layer 151, the second pattern 430b, the data line 171, the source electrode 173, the drain electrode 175, and the third pattern 430c may be formed using one mask. The mask may be a slit mask or a halftone mask. The semiconductor layer 151 extends under the data line 171.

As shown in FIG. 19, a passivation layer 180 is formed on substantially the entire surface of the first substrate 110, including the data lines 171, the source electrodes 173, the drain electrodes 175, and the third pattern 430c. Contact hole 181 is formed through the passivation layer 180 to partially expose the drain electrode 175, and pixel electrode 191 is formed in the pixel area to be connected with the drain electrode 175 through the contact hole 181.

As shown in FIG. 20, color filter 230 is formed in the pixel area of the second substrate 210, and light blocking member 220 is formed at the interface of the pixel area, partially overlapping the color filter 230. Further, the light blocking member 220 may be further formed in the non-display area ND on the second substrate 210.

As shown in FIG. 21, a sealant 310 is formed on the light blocking member 220 in the non-display area ND of the second substrate 210. In this configuration, the diameter of the spacer in the sealant 310 may be from about 3.5 μm to about 4.5 μm.

As shown in FIG. 22, the first substrate 110 and the second substrate 210 are assembled together, and the sealant 310 is hardened.

Though not shown, a plurality of data driver ICs (410 in FIG. 15) is formed at a side in the non-display area ND on the first substrate 110, before the sealant 310 is formed.

The first pattern 430a, the second pattern 430b, and the third pattern 430c constitute a step compensating member 430. The step compensating member 430 overlaps the sealant 310. Further, the step compensating member 430 is arranged to form a general zigzag pattern with the data driver ICs (410 in FIG. 15). That is, the step compensating members are formed between and offset from the data driver ICs.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
|---|---|
| DD: display area | ND: Non-display area |
| 102: First mother substrate | 104: Panel region of first mother substrate |
| 110: First substrate | 121: Gate line |
| 151: Semiconductor layer | 171: Data line |
| 173: Source electrode | 175: Drain electrode |
| 191: Pixel electrode | 202: Second mother substrate |
| 204: Panel region of second mother substrate | 210: Second substrate |
| 310: Sealant | 320: Spacer |
| 410: Data driver IC | 420: Data voltage supply line |
| 430: Step compensating member | |

What is claimed is:

1. A liquid crystal display, comprising:
a first substrate and a second substrate each including a display area and a non-display area, the display areas positioned opposite to each other, and the non-display areas positioned opposite to each other;
a plurality of data driver ICs formed in the non-display area of the first substrate;
a plurality of data voltage supply lines connected to the data driver ICs and extending to the display area of the first substrate;
a sealant positioned between the first substrate and the second substrate to surround the display areas; and
a plurality of step compensating members each formed outside the sealant on the non-display area of one of the first substrate and the second substrate,
wherein the data voltage supply lines overlap the sealant and the step compensating member; and
wherein ones of the step compensating members are positioned in alternating manner with ones of the data driver ICs so that the step compensating members are each positioned at one or more first distances from the sealant and the data driver ICs are each positioned at one or more second distances from the sealant, the second distances being different from the first distances.

2. The liquid crystal display of claim 1,
wherein at least two of the step compensating members have differing distances from the sealant.

3. The liquid crystal display of claim 2, wherein:
the larger the cell gap between the first substrate and the second substrate, the closer the step compensating members are formed to the sealant.

4. The liquid crystal display of claim 1,
wherein each step compensating member has approximately a same distance from the sealant.

5. The liquid crystal display of claim 4, wherein:
the larger the cell gap between the first substrate and the second substrate, the higher the thickness of the step compensating members are formed.

6. The liquid crystal display of claim 1, further comprising:
light blocking members having widths larger than that of the sealant, and formed between the first substrate and the second substrate so as to surround the display area.

7. The liquid crystal display of claim 1, further comprising:
a spacer formed in the display area between the first substrate and the second substrate,
wherein the step compensating members are made of the same material as the spacer.

8. The liquid crystal display of claim 1, wherein:
the step compensating members comprise a metal.

9. The liquid crystal display of claim 1, further comprising:
color filters formed in the display area of the first substrate or the second substrate,
wherein the step compensating members comprise a same material as that of the color filters.

10. The liquid crystal display of claim 9, further comprising:
light blocking members formed in the display area of the first substrate or the second substrate to partially overlap the color filters,
wherein the step compensating members comprise a same material as the color filters and the light blocking members.

11. The liquid crystal display of claim 1, wherein:
the step compensating members comprise a general polygon, circle, or ellipse shape.

12. A method of manufacturing a liquid crystal display, comprising:
(a) receiving a first mother substrate and a second mother substrate which are each divided into a plurality of panel regions each including a display area and a non-display area;
(b) forming a plurality of data driver ICs in the non-display area of the first mother substrate, and forming a plurality of data voltage supply lines connected to the data driver ICs and extending to the display area of the first mother substrate;
(c) forming a plurality of step compensating members each in the respective non-display area of one of the first mother substrate and the second mother substrate; and
(d) forming a sealant on one of the first mother substrate and the second mother substrate, to surround the display areas,
wherein each step compensating member is positioned outside the sealant,
wherein at least some of the data voltage supply lines extend under the sealant,
wherein the step compensating member is positioned generally inline with the at least some of the data voltage supply lines; and
wherein the step compensating members are each positioned at one or more first distances from the sealant and the data driver ICs are each positioned at one or more second distances from the sealant, the second distances being different from the first distances.

13. The method of claim 12, further comprising:
(e) separating the first mother substrate and the second mother substrate along the panel regions.

14. The method of claim 13, wherein:
the step compensating members are formed inside the panel region, and
in (e), the step compensating members remain on the liquid crystal display.

15. The method of claim 13, wherein:
the step compensating members are formed outside the panel region, and
in (e), the step compensating members are removed from the liquid crystal display.

16. The method of claim 12, wherein:
the step compensating members have differing distances from the sealant.

17. The method of claim 16, wherein:
the larger the cell gap between the first mother substrate and the second mother substrate, the closer the step compensating members are formed to the sealant.

18. The method of claim 12, wherein:
each of the step compensating members has at least approximately the same distance from the sealant.

19. The method of claim 18, wherein:

the larger the cell gap between the first mother substrate and the second mother substrate, the higher the thickness of the step compensating members are formed.

20. The method of claim 12, further comprising:

(f) forming light blocking members having widths larger than that of the sealant, and formed between the first mother substrate and the second mother substrate so as to surround the display area.

21. The method of claim 12, wherein:

(c) further comprises forming a spacer in the display area between the first mother substrate and the second mother substrate, wherein the spacer and the step compensating members are made of the same material.

22. The method of claim 12, wherein:

the step compensating members comprise a metal.

23. The method of claim 12, wherein:

(c) further comprises forming color filters in the display area on one of the first mother substrate and the second mother substrate, wherein the color filter and the step compensating members comprise the same material.

24. The method of claim 23, wherein:

(c) further comprises forming a light blocking member in the display area of either the first mother substrate or the second mother substrate and partially overlapping the color filters, wherein the step compensating members comprise the same material as the color filters and the light blocking members.

25. The method of claim 12, wherein:

the step compensating members each comprise a general polygon, circle, or ellipse shape.

26. The method of claim 12, wherein:

(d) further comprises forming the dummy compensating member among the panel regions between the first mother substrate and the second mother substrate.

27. A liquid crystal display, comprising:

a first substrate and a second substrate each including a display area and a non-display area, the display areas positioned opposite to each other, and the non-display areas positioned opposite to each other;

a plurality of data driver ICs formed at a side in the non-display area of the first substrate;

a sealant positioned between the first substrate and the second substrate to surround the display areas; and a plurality of step compensating members overlapping the sealant, wherein the step compensating members each comprise a plurality of metal layers, and wherein the step compensating members are arranged along a side of the sealant, the step compensating members each positioned at a first distance from the sealant and the data driver ICs each positioned at a second distance from the sealant, the second distance different from the first distance, and ones of the step compensating members positioned in alternating manner with ones of the data driver ICs.

28. The liquid crystal display of claim 27, further comprising:

gate lines and data lines formed in the display area of the first substrate, wherein the step compensating member is formed by stacking the layers of the gate lines and the data lines.

29. The liquid crystal display of claim 28, further comprising:

a semiconductor layer formed in the display area of the first substrate, wherein the step compensating members further comprise the semiconductor layer.

30. The liquid crystal display of claim 27, wherein:

the sealant includes a generally ball-shaped spacer therein, and the diameter of the spacer is from about 3.5 µm to about 4.5 µm.

31. A method of manufacturing a liquid crystal display, comprising:

(a) receiving a first substrate and a second substrate each including a display area and a non-display area;

(b) forming a plurality of step compensating members by stacking a plurality of metals on the first substrate;

(c) forming a plurality of data driver ICs at a side of the non-display area of the first substrate; and (d) forming a sealant on one of the first substrate and the second substrate, to surround the display area, wherein the step compensating members overlap the sealant and are arranged along a side of the sealant, the step compensating members each positioned at one or more first distances from the sealant and the data driver ICs each positioned at one or more second distances from the sealant, the second distances being different from the first distances, and ones of the step compensating members positioned in alternating manner with ones of the data driver ICs.

32. The method of claim 31, wherein:

(b) further comprises forming gate lines and data lines in the display area of the first substrate, wherein the step compensating members are formed by stacking the same layers as the those of the gate lines and the data lines.

33. The method of claim 32, wherein:

(b) further comprises forming a semiconductor layer in the display area of the first substrate, wherein the step compensating members are formed by further stacking the semiconductor layer.

34. The method of claim 31, wherein:

the sealant includes a generally ball-shaped spacer therein, and the diameter of the spacer is from about 3.5 µm to about 4.5 µm.

* * * * *